US012306939B2

(12) United States Patent
Hicks et al.

(10) Patent No.: US 12,306,939 B2
(45) Date of Patent: May 20, 2025

(54) HIDDEN SECURITY FLAGS FOR RANSOMWARE ATTACK PROTECTION

(71) Applicant: International Business Machines Corporation, Armonk, NY (US)

(72) Inventors: Andrew C. M. Hicks, Highland, NY (US); John S. Werner, Dutchess, NY (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 18/186,418

(22) Filed: Mar. 20, 2023

(65) Prior Publication Data

US 2024/0320326 A1    Sep. 26, 2024

(51) Int. Cl.
*G06F 21/55*    (2013.01)
*G06F 21/60*    (2013.01)

(52) U.S. Cl.
CPC .......... *G06F 21/554* (2013.01); *G06F 21/602* (2013.01)

(58) Field of Classification Search
CPC ............................. G06F 21/554; G06F 21/602
See application file for complete search history.

(56) References Cited

U.S. PATENT DOCUMENTS

| 7,203,828 | B2 | 4/2007 | Jordan |
| 9,680,833 | B2 | 6/2017 | Dulce |
| 9,734,337 | B1 | 8/2017 | Patton |
| 10,503,904 | B1 | 12/2019 | Singh |
| 10,893,068 | B1 | 1/2021 | Khalid |
| 10,938,854 | B2 | 3/2021 | Strogov |
| 12,155,641 | B1 * | 11/2024 | Soccorsy .............. H04L 63/102 |
| 2020/0128027 | A1 * | 4/2020 | Hittel .................... G06F 21/552 |
| 2020/0204589 | A1 * | 6/2020 | Strogov ............. H04L 63/1416 |
| 2020/0387609 | A1 * | 12/2020 | Hansen ................ G06F 21/552 |
| 2022/0255850 | A1 * | 8/2022 | Reed ................... H04L 41/0681 |
| 2024/0205249 | A1 * | 6/2024 | Brukman ............ H04L 63/0428 |
| 2024/0248803 | A1 * | 7/2024 | Rothschild .......... G06F 11/1458 |
| 2024/0273069 | A1 * | 8/2024 | Mou .................. G06F 16/1824 |
| 2024/0364733 | A1 * | 10/2024 | Burns ................ H04L 63/1425 |

OTHER PUBLICATIONS

Disclosed Anonymously. "Method of Early Detection and Halting of Ransomware Attacks," IPCOM000268682D, IP.com, Feb. 15, 2022, 5 pages. https://priorart.ip.com/IPCOM/000268682.

* cited by examiner

*Primary Examiner* — Linglan Edwards
*Assistant Examiner* — Jacob Benedict Knackstedt
(74) *Attorney, Agent, or Firm* — Monchai Chuaychoo

(57) ABSTRACT

A method and system for detecting and stopping a ransomware attack. Prior to any attack hidden security flags are inserted into data that is stored. The data can be unencrypted either because the user does not intend to encrypt the data, the data has yet to be encrypted as part of a normal encryption process or is subject to additional encryption. A request is received to encrypt data using an encryption module. The process determines if the data to be encrypted includes a hidden security flag. If the data includes a hidden security flag a hidden security flag counter is incremented. The encryption is stopped if the value of the hidden security flag counter exceeds a threshold value. A user can be notified of the halting of the encryption process.

20 Claims, 3 Drawing Sheets

HIDDEN SECURITY FLAGS FOR RANSOMWARE ATTACK PROTECTION

BACKGROUND

The present disclosure relates to system security, and more specifically, to protecting systems from ransomware attacks.

Ransomware is a type of malware from cryptovirology that threatens to publish the victim's data or perpetually block access to the data unless a ransom is paid. Simple ransomware may lock the system in a way which is not difficult for a knowledgeable person to reverse. However, more advanced malware uses a technique called cryptoviral extortion, in which it encrypts the victim's files, making them inaccessible, and then demands a ransom payment to decrypt them. In a properly implemented cryptoviral extortion attack, recovering the files without the decryption key is an intractable problem Ransomware attacks are typically carried out using a trojan that is disguised as a legitimate file that the user is tricked into downloading or opening when it arrives as an email attachment. However, some versions can travel between computers without user interaction.

Current solutions only detect a ransomware attack after the entire file system or at least a larger portion (multiple directories) of the file system have been encrypted. To repair the affected files from a ransomware attack a full restore of the file system must be performed. Typically, a full system restore comes from a back-up, if available. However, this takes a lot of time and stops operation of the affected file system. In a worst case scenario, the user has no backup of the encrypted files and loses all the files, the bad actor encrypts one copy of the data and deletes or blocks access to the backup files, the bad actor encrypts the backup files, or the user is forced to pay the ransomware bad actor to get their files back.

SUMMARY

According to embodiments of the present disclosure, a method for detection and stopping a ransomware attack is disclosed. Prior to any attack hidden security flags are inserted into data that is currently unencrypted. The data can be unencrypted either because the user does not intend to encrypt the data or the data has yet to be encrypted as part of a normal encryption process. A request is received to encrypt data using an encryption module. The process determines if the data to be encrypted includes a hidden security flag. If the data includes a hidden security flag a hidden security flag counter is incremented. The encryption is stopped if the value of the hidden security flag counter exceeds a threshold value. A user can be notified of the halting of the encryption process.

According to embodiments of the present disclosure, a system for detecting and stopping a ransomware attack is disclosed. The system includes a computing device and at least one storage device connected to the computing device for storing data used by the computing device. The data includes unencrypted data stored on the storage device. An encryption device is provided that can encrypt data on the storage device. A hidden security flag database is connected to the encryption device and includes a record of all of the hidden security flags that are in use on the system. A hidden security flag placement module is provided to place the hidden security flags into the unencrypted data. A hidden security flag encryption detection module is provided to determine if data being encrypted contains a hidden security flag and to halt execution of the encryption if too many hidden security flags are detected being encrypted.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
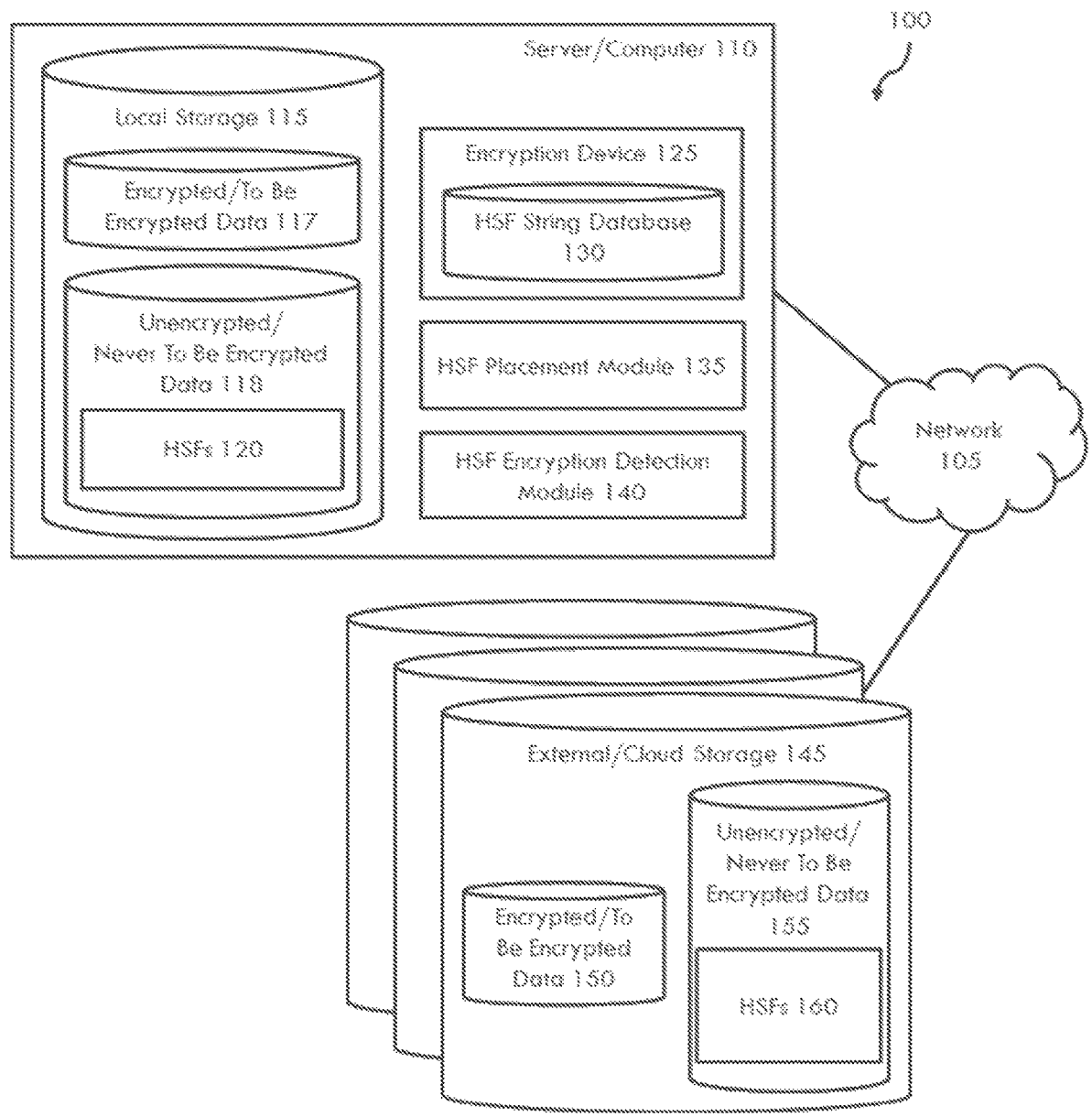
FIG. 1 is a block diagram illustrating a system that is configured to insert hidden security flags (HSFs) into specific files that are never intended to be encrypted according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data security, more particular aspects relate to detecting and stopping a ransomware attack. While the present disclosure is not necessarily limited to such applications, various aspects of the disclosure may be appreciated through a discussion of various examples using this context.

A ransomware attack is one of the most disruptive issue that can happen to files in a file system. This can have a significant impact to the file system and file owners. Ransomware attacks can't be detected quick enough to prevent the access loss to files. Typically, the owner of a file system realizes the ransomware attack only after the files are encrypted.

Current solutions cannot prevent attacks which affect the whole file system or a large section of the file system. Current solutions only detect a ransomware attack after a section or after the entire file system has been encrypted. Further, during the attack, the attackers immediately begin their ransomware encryption before their intrusion is detected. As such they just begin encrypting a large chunk of memory without knowing exactly what the data is.

FIG. 1 is a block diagram illustrating a system 100 that is configured to insert hidden security flags (HSFs) into specific files that are never intended to be encrypted. The system is configured to detect and determine an encryption request on the HSFs and to respond to the encryption request by stopping any further encryption of data on the associated system. System 100 includes a network 105, a server/computer 110, and optional external/cloud storage 145. When present the server/computer 110 and external/cloud storage 145 are interconnected via network 105.

Network 105 can be any type of wired and/or wireless network. The network 105 can employ any communication protocol that allows data to be transferred between components of the system. For example, Bluetooth, Wi-Fi, Cellular (e.g., 3G, 4G, 5G), optical fiber, Ethernet, etc.

The computer 110 includes local storage 115, an encryption device 125, an HSF placement module 135, and an HSF encryption detection module 140. The local storage 115 can be any type of storage device that is capable of storing data. For example, the local storage 115 can be a hard disc drive, a solid state disc drive, flash memory, etc. In some embodiments, the local storage includes external storage devices that are connected to the computer 110 separately from the network 105. For example, the external storage devices can be portable memory devices such as USB memory or other portable memory that connect to the computer 110 through the use of various ports on the computer other than the network ports. The local storage 115 holds two different types of data. The first type of data is data that is either already encrypted or intended to be encrypted 117 at some point in time. For example, an encryption cycle for this data can encrypt the data on a regular basis, such as ever hour, every 12 hours, every day, at a specific time of day, etc. The second type of data is data that is unencrypted and intended to never be encrypted 118. It should be noted that while the two types are data are illustrated as being separate within the local storage, it is not necessary that for them to be stored in separate databases or areas of the local storage. Further it should be noted that not all data/files are encrypted which can be a choice based on what the data/files are, the processing power to perform the encryption, cost, etc. For example, Data/files that would never be encrypted 118 can include program executables, temporary files, and other non-essential data.

To help protect the data in the local storage from ransomware and other types of attacks each file or other unit in the unencrypted data (or a subset of files or other units in the unencrypted data) is supplemented with at least one hidden security flag 120. The hidden security flags 120 can be placed within the existing memory block located along any/all allocation boundaries for the data. The number of HSFs 120 can be determined by the end user of computer 110. In some embodiments, the HSFs 120 can be placed at periodic intervals in the data. However, to increase the security of the system, in some embodiments, the size of memory between each HSF 120 in the unencrypted data is not consistent. That is there is no discernable pattern as to where in the data the HSF 120 is located. In some embodiments, the HSFs 120 are placed within a block of memory that is associated with the contents of a file or folder (e.g., before a file, after a file, or between multiple files that are placed right next to each other in memory) or can be hidden within a file. In some embodiments, HSFs 120 can be placed within already encrypted data. This can be done to provide additional security as this data is still vulnerable to a second encryption within a ransomware attack. In some embodiments, the length of an HSF 120 should be unique enough that the likelihood that the exact bit string will exist anywhere else in memory is very low. In some embodiments, this uniqueness can be achieved by hashing a crypto identifier in combination with a large prime salt.

To encrypt the data on the local storage an encryption device 125 is used. Encryption device 125 is used to encrypt the data 117 in the local storage 115. The encryption device 125 is any hardware capable of encrypting data such as the IBM Crypto Card or any other hardware security module (HSM). The encryption device 125 is configured to implement one or more types of encryption on the data 117. During a ransomware attack the bad actor tries to take control of the encryption device 125 to cause the malicious encryption of the local storage 115.

In addition to managing the encryption of data 117, the encryption device 125 contains an HSF string database 130. The HSF string database 130 stores the string of bits for all of the HSFs 120 that are placed within the stored data 118. In some embodiments, a single HSF 120 can be used in multiple locations. In some embodiments, there can be a plurality of HSFs 120 which are used one or more times. In some embodiments, database 130 (and hence the HSFs 120) can be encrypted such that a bad actor is not able to easily view the HSFs 120 in memory, and use that knowledge to skip over those particular blocks during a ransomware attack. To ensure that the data remains accessible to the user an access manager (not illustrated) will be made aware of the HSF blocks during normal use. This will prevent the triggering of the ransomware protection of the present disclosure. For example, the access manager can remove the HSFs 120 from the file prior to opening the file. If a bad actor attempts to encrypt the data by circumventing the access manager, it will be difficult to encrypt without hitting an HSF 120 which allows a ransomware attack to be easily identified and stopped. An administrator can update/change the HSF at any time which would update all instances within memory; this would make the previous HSF no longer valid and should not be done for removable media To insert the HSFs 120 into the data, an HSF placement module 135 is utilized to put HSFs in memory locations associated with database 118. In some embodiments, the HSF placement module 135 is used to determine the location of the HSFs 120. However, in other embodiments, a user could manually place, in memory, HSF blocks. For example, the operating system, such as the IBM Z operating systems (e.g., z/OS, LoZ), can leave space intentionally open where the user can insert the HSFs 120. In a multitenant environment this open space can be handled entirely by middle/firmware, treating the OS as an untrusted source (i.e., the OS never touches the HSF key string). In some embodiments, the user can manually select the files and/or locations to place the HSFs 120. In other embodiments the HSF placement module 135 randomly places the HSFs 120 in the database 118. In some embodiments the HSF placement module 135 considers how long a file has remained untouched in determining which files to insert the HSFs 120. That is that the file has not been touched within a threshold period of time. For example, if a file has not been touched for 1 month the file may then have the HSFs 120 inserted into it. However, any threshold period can be used. Further, the threshold can be dependent or vary based on the type of file. For example, files containing personal information can have a shorter threshold than other types of data. By using a threshold period of time, this allows the system to identify files where the user or system has not indicated whether the file belongs in database 117 or 118 and determines where the files should belong. The system makes the assumption that if the file has existed on server/computer 110 for the threshold period of time, and was not yet encrypted that the user is unlikely to encrypt the file, and it is safe to assume that said file belongs in database 118 and not database 117.

In some embodiments, a fixed number of HSFs 120 can be moved randomly between files of database 118 as more data is stored within database 118 such that the HSFs 120 are spread out across the memory space. As the number of HSFs is fixed in some embodiments, no additional memory is consumed. In some embodiments, the HSFs 120 can be moved when the user accesses a file containing an HSF to ensure that no errors are created when opening the file under normal circumstances. For example, in situations where the HSFs cause what appears to be data corruption within the program because the program is seeing unexpected data.

The HSF encryption detection module 140 is a component of the system that identifies a potential ransomware attack. The HSF encryption detection module is activated during an encryption event that is started by encryption device 125. The HSF encryption detection module monitors the encryption device to detect an encryption request of an HSF. The encryption request of an HSF can indicate a ransomware attack. Because HSFs are placed in locations that the user specified would never be encrypted, a threshold number of encryption requests on these HSFs indicates that a bad actor has gained access to the system and is trying to encrypt a large block of data without even knowing the contents with the intention of holding it for ransom. The operation of the HSF encryption detection module 140 is described in further detail with reference to FIG. 2

External/cloud storage 145 is storage used by the computer 110 that is accessed through the network 105. The cloud storage 145 is similar to the local storage 115 in that it is comprised of encrypted/to be encrypted data 150 and unencrypted/never to be encrypted data 155. Again, it should be noted that 150 and 155 are identifiers for types of data and do not have to be separate databases. The External/cloud storage 145 utilizes modules 125, 135, and 140 of server/computer 110 to enable protection in a similar manner to what was described earlier with reference to the local storage 115.

Figure 2:
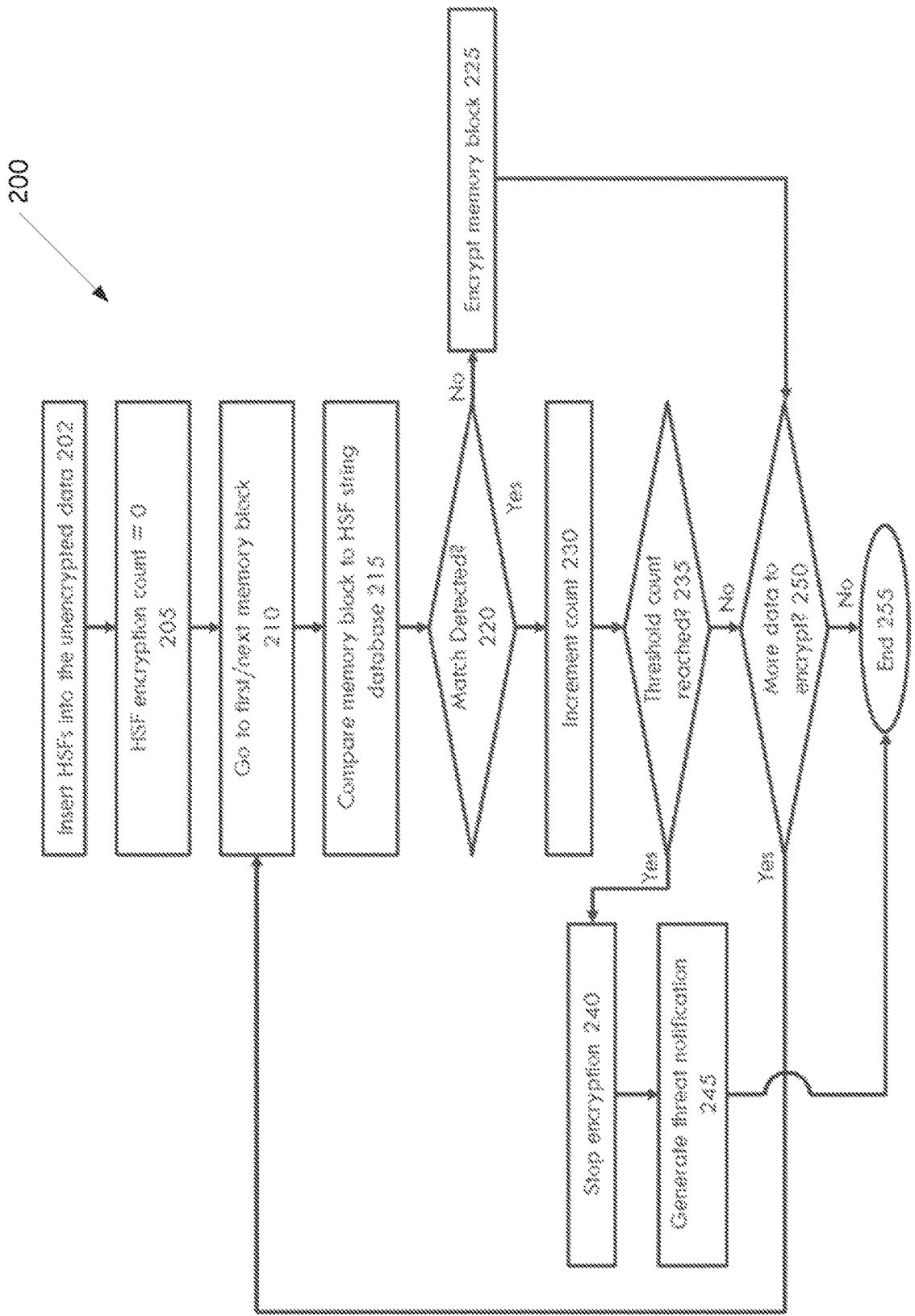
FIG. 2 is a flowchart illustrating a process 200 to identify a ransomware attack according to embodiments of the present disclosure.

FIG. 2 is a flowchart illustrating a process 200 to identify a ransomware attack. The process does so by monitoring activity related to an encryption request of an HSF. The HSF 120 was inserted into the file or data prior to the beginning of the process 200. However, in some embodiments process 200 begins by inserting the HSFs into the files. This is illustrated at step 202. Process 200 is executed by HSF encryption detection module 140 and can begin execution upon receiving a request to encrypt data using encryption device 125 when the HSFs were previously inserted. This is illustrated at step 205. At this step the process 200 begins by setting a HSF encryption count to zero. This counter is a count of the number of HSFs that have been encrypted during the current encryption event. Next the process proceeds to the first memory block that is to be encrypted. This is illustrated at step 210. The current memory block is compared to the strings of bits that are stored in the HSF database. This is illustrated at step 215. The process 200 then determines if there is a match between the current memory block and any entry in the HSF string database 130. This is illustrated at step 220. In some embodiments, the HSF 120 is shorter than the currently selected memory block, and a match is identified if the full HSF is contained within the longer string of the currently selected memory block.

If no match is found at step 220, the process proceeds to encrypt the memory block. This is illustrated at step 225. The encryption device 125 encrypts the memory block using an encryption process. Any known encryption process can be used to encrypt the data. For example, the encryption device 125 can use symmetric, asymmetric, or hybrid encryption approaches. Further the encryption device 125 can use a number of different algorithms for the encryption. For example, these algorithms can include advanced encryption system (AES), triple data encryption algorithm (3-DES), SNOW, RSA, and Elliptic curve cryptography (ECC). However, any other encryption algorithm can be used. In some embodiments, the process 200 can search through all memory blocks slated for encryption prior to performing the encryption and only execute the encryption if the threshold HSF encryption count is not reached. As such encryption step 225 is not started until such time as all files and blocks have been analyzed.

If a match is found at step 220 the process proceeds to increment the HSF encryption counter by one. This is illustrated at step 230. Next the process considers if the threshold number for the HSF encryption counter has been reached. This is illustrated at step 235. The threshold number can be set to any number that the user desires. In some embodiments, the HSF encryption count threshold may be set to one such that any attempt to encrypt an HSF will stop the encryption routine. In other embodiments, the HSF encryption count threshold can be set to a value greater than 1 (e.g., 2 or 3) such that encryption is not stopped during a legitimate encryption routine where the user either purposely decided to encrypt data that was previously part of database 118 or made a mistake and forgot that an HSF was present in the data. However, the lower the number that is used for the threshold, the greater the protection from a ransomware attack the system has.

If the process determines that the threshold number has been reached the process stops the operation of the encryption device 125. Once the operation of the encryption device has been stopped the process 200 can generate a threat notification to server/computer 110 administrator(s) or user. This is illustrated at step 245. The notification allows the administrator and/or user to know that a ransomware attack was likely attempted and a threat actor has accessed the system. In some embodiments, the process can provide the user with an option to override the cessation of the encryption at this step. This allows for the intentional encryption of data that was legitimately initiated by the user. In some embodiments the ability to override the cessation of encryption requires additional actions by the user. For example, multifactor authentication can be used to ensure to user is the one actually initiating the override. In another example, a second user can be required to confirm the override. These additional actions can help ensure that the threat actor is not the one attempting to override the protection as part of their attack. It should be noted that step 245 is an optional step that need not be performed. When not performed, the process simply ends the encryption process. This is illustrated at step 255.

After executing block 225 or if a threshold HSF encryption count has not been reached, the method executes step 250 to determine if there is more data to encrypt in the current session. If there is more data to encrypt, the method loops back to step 210 to analyze the next memory block. If there is no more data to encrypt the process ends at step 255.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 3:
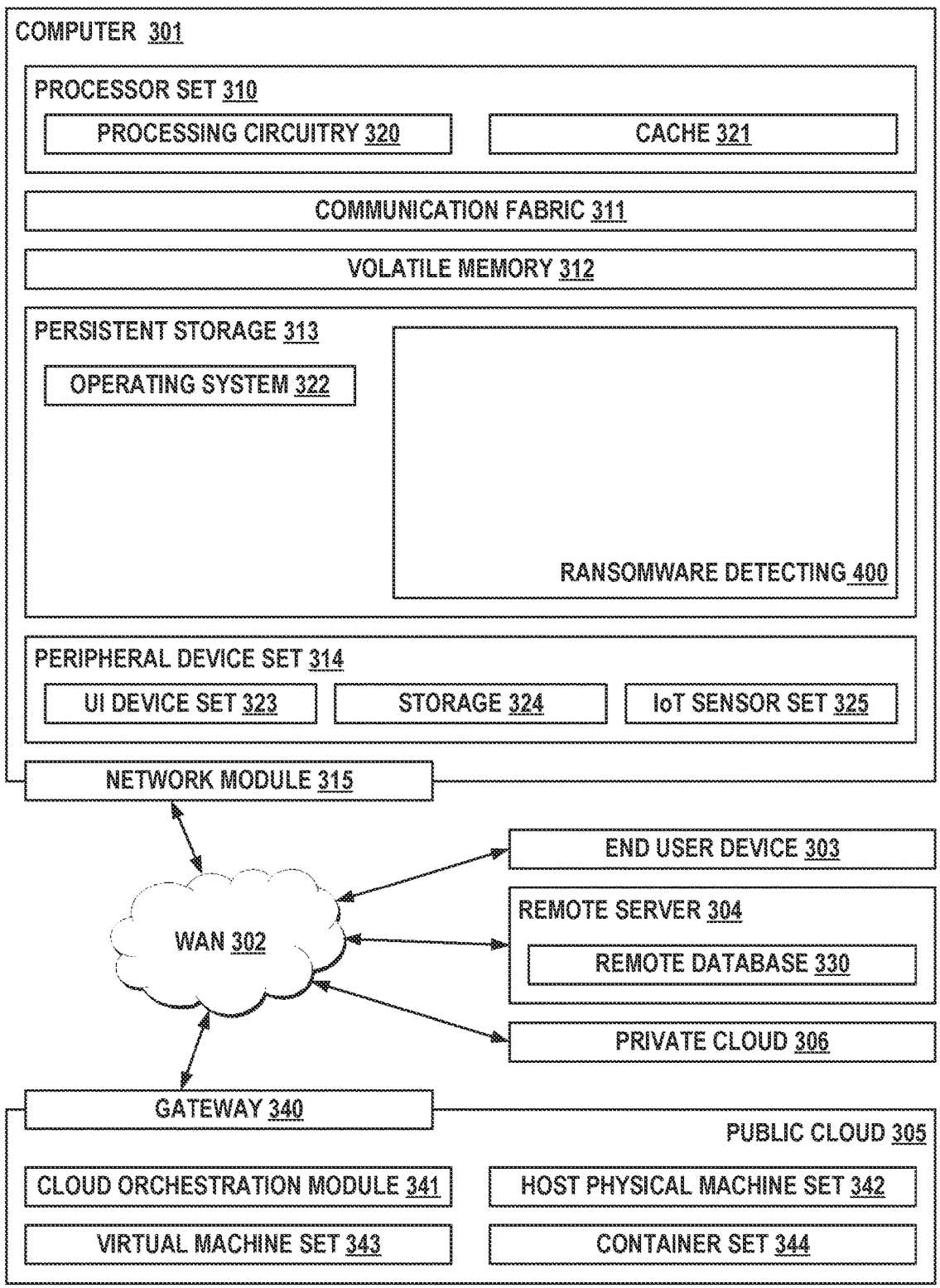
FIG. 3 is a diagrammatic illustration of a computing environment according to embodiments of the present disclosure.

FIG. 3 is a diagrammatic illustration of a computing environment 300. Computing environment 300 contains an example of an environment for the execution of at least some of the computer code involved in performing at least a portion of the present disclosure, such detecting and stopping a ransomware attack 400. In addition to block 400, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 400, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 321 and the other storage media discussed below. The program instructions, and associated data, are accessed by processor set 310 to control and direct performance of the disclosed methods. In computing environment 300, at least some of the instructions for performing the disclosed methods may be stored in block 200 in persistent storage 313.

Communications fabric 311 is the signal conduction path that allows the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in block 400 typically includes at least some of the computer code involved in performing the disclosed methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the disclosed methods can typically be downloaded to computer 301 from an external computer or external storage device through a network adapter card or network interface included in network module 315.

Wide area network (WAN) 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for detecting and stopping a ransomware attack, comprising:
   inserting, by an HSF (hidden security flag) placement module, a plurality of HSFs into a first data stored on a storage device and into a second data stored on the storage device, wherein the first data comprises data that is intentionally unencrypted and data that has not yet been encrypted and the second data comprises of encrypted data and wherein a value of, each of the plurality of HSFs is a unique value that generated by hashing a crypto identifier in combination with a prime salt;
   receiving an encryption request for the first data;
   determining whether at least one of the plurality of HSFs is included in the encryption request;
   incrementing an HSF counter upon detecting each HSF from the plurality of HSFs within the first data being encrypted;
   determining, by a hidden security flag encryption detection module, whether the first data associated with the encryption request includes the plurality of HSFs
   comparing the HSF counter to a predetermined HSF threshold value; and
   stopping the encryption request in response to the HSF counter exceeds the predetermined HSF threshold value prior to the ransomware attack; and
   notifying one or more users of a halt to the encryption request.

2. The method of claim 1, the HSF placement module utilizes a placement algorithm, wherein the placement algorithm comprises of, randomly inserting the one or more HSFs between files, inserting before or after a file located on the storage device, inserting between multiple files or inserting within the file.

3. The method of claim 2, wherein the storage device comprises of, hard disc drive, a solid state drive and flash memory.

4. The method of claim 2, wherein the placement algorithm further comprises of determining whether the file in the storage device has been accessed within an access threshold time and inserting the one or more HSFs if the access time of the file is less than the access threshold time.

5. The method of claim 4, wherein the placement algorithm further comprises of determining whether file type of the file in the storage device contains personal information and setting a period that is less than the access threshold time based on the file containing personal information.

6. The method of claim 1, wherein determining if the HSF is included comprises:
   searching a hidden security file string database for the hidden security flag.

7. The method of claim 1, wherein an administrator can update/change the one or more HSFs at any time.

8. The method of claim 7, wherein notifying further comprises:
   providing the user with an option to resume encryption.

9. The method of claim 1, further comprising:
   prior to receiving the encryption request, inserting into data on a storage device a plurality of hidden security flags into the data.

10. The method of claim 9, further comprising:
    memorizing, by an access manager, one or more HSF locations associated with the one or more HSFs that have been inserted into the storage device; and
    removing the inserted HSFs from the one or more HSFs prior to opening a file.

11. The method of claim 9, wherein the one or more HSFs are manually placed into the data.

12. The method of claim 1, wherein the encryption request is a portion of a larger encryption block of data to be encrypted, further comprising:
    in response to not detecting the hidden security flag, encrypting data associated with the encryption request.

13. The method of claim 12, wherein encrypting data is not performed until all data within the encryption block is analyzed for the presence of a hidden security flag.

14. A system for detecting a ransomware attack, comprising:
    a computing device;
    at least one storage device communicatively coupled to the computing device;
    unencrypted data stored on the at least one storage device;
    an encryption device configured to for encrypting data, residing on the at least one storage device and the encryption device resides in the computing device;
    a HSF (hidden security flag) database is communicatively coupled to the encryption device including a record of all hidden security flags;
    an HSF placement module is communicatively coupled to the encryption device, wherein the HSF placement module can place a plurality of hidden security flags in the unencrypted data;
    an HSF encryption detection module is communicatively coupled to the encryption device, wherein determine if data being encrypted contains a hidden security flag and to halt execution of the encryption device in response to detecting the hidden security flag;
    an HSF placement module configured to place a plurality of hidden security flags in the unencrypted data; and
    an HSF encryption detection module configured to determine if data being encrypted contains a hidden security flag and to halt execution of the encryption device in response to detecting the hidden security flag;
one or more computer readable storage media having computer-readable program;
instructions stored on the one or more computer readable storage media, the program instructions executes, by the computing device, a computer-implemented method comprising the steps of:
inserting, by an HSF (hidden security flag) placement module, a plurality of HSFs into a first data stored on a storage device and into a second data stored on the storage device, wherein the first data comprises data that is intentionally unencrypted and data that has not yet been encrypted and the second data comprises of encrypted data and wherein a value of, a plurality of HSFs is a unique value that generated by hashing a crypto identifier in combination with a prime salt;
receiving an encryption request for the first data:
determining whether the one or more HSFs is included in the encryption request;
incrementing an HSF counter upon detecting each HSF from the plurality of HSFs within the first data being encrypted;
determining, by a hidden security flag encryption detection module, whether the first data associated with the encryption request includes the plurality of HSFs;
comparing the HSF counter to a predetermined HSF threshold value; and
stopping the encryption request if in response to the HSF counter exceeds the predetermined HSF threshold value prior to the ransomware attack; and
notifying one or more users of a halt to the encryption request.

15. The system of claim 14, further comprising:
halting, by the HSF encryption detection module, an execution of the encryption device in response to detecting an attempt to encrypt a number of HSFs in the data that exceed a threshold number.

16. The system of claim 14, further comprising:
detecting, HSF encryption detection module, the hidden security flag by identifying in the data a hidden security flag stored in the HSF database.

17. The system of claim 14, further comprising:
placing, by the HSF placement module, the one or more hidden security flags randomly in the unencrypted data.

18. The system of claim 14, wherein an administrator can update/change the one or more HSFs at any time.

19. The system of claim 14, further comprising:
notifying, the HSF encryption detection module, a user in response to halting the encryption device.

20. A computer-program product for detecting a ransomware attack, comprising:
one or more computer readable storage media having computer-readable program;
instructions stored on the one or more computer readable storage media, the program instructions execute, a computer-implemented method comprising the steps of:
inserting, by an HSF (hidden security flag) placement module, a plurality of into a first data stored on a storage device and into a second data stored on the storage device, wherein the first data comprises data that is intentionally unencrypted and data that has not yet been encrypted and the second data comprises of encrypted data and wherein a value of, the plurality of HSFs is a unique value that generated by hashing a crypto identifier in combination with a prime salt;
receiving an encryption request for the first data;
determining whether the one or more HSFs is included in the encryption request;
incrementing an HSF counter upon detecting each HSF from the plurality of HSFs within the first data being encrypted;
determining, by a hidden security flag encryption detection module, whether the first data associated with the encryption request includes the plurality of HSFs;
comparing the HSF counter to a predetermined HSF threshold value; and
stopping the encryption request if the HSF counter exceeds the predetermined HSF threshold value prior to the ransomware attack; and
notifying one or more users of a halt to the encryption request.

* * * * *